(12) United States Patent
Ahmed et al.

(10) Patent No.: US 12,530,345 B2
(45) Date of Patent: Jan. 20, 2026

(54) DYNAMIC THREAT MITIGATING OF GENERATIVE ARTIFICIAL INTELLIGENCE MODELS

(71) Applicant: Infosys Limited, Bangalore (IN)

(72) Inventors: Syed Ahmed, Bangalore (IN); Ritarshi Chakraborty, Bangalore (IN); Naveen Varadarajan, Bangalore (IN)

(73) Assignee: Infosys Limited, Bangalore (IN)

( * ) Notice: Subject to any disclaimer, the term of this patent is extended or adjusted under 35 U.S.C. 154(b) by 27 days.

(21) Appl. No.: 18/797,798

(22) Filed: Aug. 8, 2024

(65) Prior Publication Data
US 2025/0055867 A1     Feb. 13, 2025

(30) Foreign Application Priority Data
Aug. 10, 2023   (IN) .............................. 202341053821

(51) Int. Cl.
*G06F 21/00* (2013.01)
*G06F 16/23* (2019.01)
(Continued)

(52) U.S. Cl.
CPC ...... *G06F 16/2423* (2019.01); *G06F 16/2365* (2019.01); *G06N 3/0475* (2023.01); *H04L 63/1425* (2013.01); *H04L 63/205* (2013.01)

(58) Field of Classification Search
CPC . H04L 63/205; H04L 63/1425; G06N 3/0475; G06F 16/2365; G06F 16/2423
(Continued)

(56) References Cited

U.S. PATENT DOCUMENTS

| 9,405,741 | B1 | 8/2016 | Schaaf et al. |
| 2021/0336983 | A1* | 10/2021 | Lee ..................... H04L 63/0245 |

(Continued)

FOREIGN PATENT DOCUMENTS

| CN | 116383027 A | 7/2023 |
| CN | 116383026 A | 9/2023 |
| KR | 20230076116 A | 5/2023 |

*Primary Examiner* — Josnel Jeudy
(74) *Attorney, Agent, or Firm* — Finnegan, Henderson, Farabow, Garrett & Dunner, LLP

(57) ABSTRACT

The disclosure relates to a method and system for dynamically mitigating threats of generative Artificial Intelligence (AI) models. Conventional systems often suffer from inefficiencies due to sequentially applying threat detection checks leading to unnecessary preprocessing and increased computational demands. Additionally, such systems typically focus only on input data, neglecting potential threats in outputs. The disclosed system and method addresses these drawbacks by employing a hierarchical structure of macro and nano classifiers. The system utilizes macro classifiers for broad initial threat categorization followed by specialized nano classifiers for detailed analysis of specific threat sub-types, thereby optimizing processing time and computational resources. The system operates in real time, applying predefined moderation rules to both input and output data to ensure comprehensive threat mitigation. Additionally, continuous telemetry data updates refine nano classifiers and threat identification mechanisms, maintaining high accuracy and adaptability. The disclosed method enhances safety efficiency and reliability of generative AI models.

20 Claims, 4 Drawing Sheets

(51) Int. Cl.
*G06F 16/242* (2019.01)
*G06N 3/0475* (2023.01)
*H04L 9/40* (2022.01)

(58) Field of Classification Search
USPC .......................................................... 726/22
See application file for complete search history.

(56) References Cited

U.S. PATENT DOCUMENTS

| | | |
|---|---|---|
| 2022/0188661 A1 | 6/2022 | Tappin |
| 2022/0350825 A1 | 11/2022 | Van De Nieuwegiessen et al. |
| 2023/0179709 A1 | 6/2023 | Dwyer et al. |
| 2023/0208869 A1 | 6/2023 | Bisht et al. |
| 2025/0175456 A1* | 5/2025 | Crabtree ............... G06F 16/909 |

* cited by examiner

DYNAMIC THREAT MITIGATING OF GENERATIVE ARTIFICIAL INTELLIGENCE MODELS

CROSS REFERENCE

This U.S. patent application claims priority under 35 U.S.C. § 119 to India application No. 202341053821, filed on Aug. 10, 2023. The entire contents of the aforementioned application are incorporated herein by reference.

TECHNICAL FIELD

The present disclosure relates to generative Artificial Intelligence (AI), and more particularly to a method and a system for dynamically mitigating threats of a generative AI model.

BACKGROUND

Often known as GenAI, generative artificial intelligence (AI) is a branch of artificial intelligence that can generate unique content like text, images, videos, audio, or even software code based on a user's input or request. It utilizes advanced machine learning models, specifically deep learning models, which mimic the cognitive and decision-making processes of the human brain.

Generative AI can create content that is indistinguishable from that created by humans. However, this power of GenAI models could be misused or lead to unintended consequences. For instance, it may generate content that is inappropriate, offensive, or biased. It may also infringe on privacy by generating content based on sensitive or personal information. Moreover, generative AI may be manipulated to spread misinformation or propaganda, which may have serious societal implications. It may also be used to generate deepfakes, creating convincing but false images, videos, or audio recordings. The present disclosure is directed to overcome one or more limitations of generative AI models stated above or any other limitations associated with the known arts.

SUMMARY

In one embodiment, a processor implemented method for dynamically mitigating threats of a generative Artificial Intelligence (AI) model is disclosed. The method includes receiving data associated with a generative AI model at a user interface (UI) of a computing device, via one more hardware processors. The data may be associated with one or more attributes. Further, the method includes applying one or more macro classifiers to the data to determine, in real time, presence of one or more types of threats from amongst a plurality of types of threats, via the one more hardware processors. Herein each macro classifier of the one or more macro classifiers is capable of computing a first threat probability score associated with a type of threat from amongst the plurality of types of threats based on the one or more attributes associated with the data. Furthermore, the method includes dynamically configuring a threat detection model having one or more nano classifiers to detect one or more sub-type of threats associated with the one or more type of threats in the data, via the one more hardware processors. Moreover, the method includes selectively moderating the data based on one or more predefined rules corresponding to each of the one or more sub-type of threats to obtain a moderated data. The moderated data is validated to determine one of presence and absence of the one or more sub-types of threats in the moderated data.

In another embodiment, a system for dynamically mitigating threats of generative Artificial Intelligence (AI) model is disclosed. In one example, the system may include one or more hardware processors and a memory communicatively coupled to the one or more hardware processors. The memory may store processor-executable instructions, which, on execution, may cause the one or more hardware processors to receive data associated with a generative AI model at a user interface (UI) of a computing device, the data associated with one or more attributes. The processor-executable instructions, on execution, may further cause the one or more hardware processors to apply one or more macro classifiers to the data to determine, in real time, presence of one or more types of threats from amongst a plurality of types of threats, wherein each macro classifier of the one or more macro classifiers is capable of computing a first threat probability score associated with a type of threat from amongst the plurality of types of threats based on the one or more attributes associated with the data. The processor-executable instructions, on execution, may further cause the one or more hardware processors to dynamically configure a threat detection model comprising one or more nano classifiers to detect one or more sub-type of threats associated with the one or more type of threats in the data. Further, the processor-executable instructions, on execution, may further cause the one or more hardware processors to selectively moderate the data based on one or more predefined rules corresponding to each of the one or more sub-type of threats to obtain a moderated data. Furthermore, the processor-executable instructions, on execution, may further cause the one or more hardware processors to validate the moderated data to determine one of presence and absence of the one or more sub-types of threats in the moderated data.

In yet another embodiment, a non-transitory computer-readable medium storing computer-executable instructions for dynamically mitigating threats of a generative Artificial Intelligence (AI) model is disclosed. The stored instructions, when executed by one or more hardware processors, may cause the one or more hardware processors to perform operations including receiving data associated with a generative AI model at a user interface (UI) of a computing device, via one more hardware processors. The data may be associated with one or more attributes. Further, the operation includes applying one or more macro classifiers to the data to determine, in real time, presence of one or more types of threats from amongst a plurality of types of threats, via the one more hardware processors. Herein each macro classifier of the one or more macro classifiers is capable of computing a first threat probability score associated with a type of threat from amongst the plurality of types of threats based on the one or more attributes associated with the data. Furthermore, the operation includes dynamically configuring a threat detection model comprising one or more nano classifiers to detect one or more sub-type of threats associated with the one or more type of threats in the data, via the one more hardware processors. Moreover, the operation includes selectively moderating the data based on one or more predefined rules corresponding to each of the one or more sub-type of threats to obtain a moderated data. The moderated data is validated to determine one of presence and absence of the one or more sub-types of threats in the moderated data.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
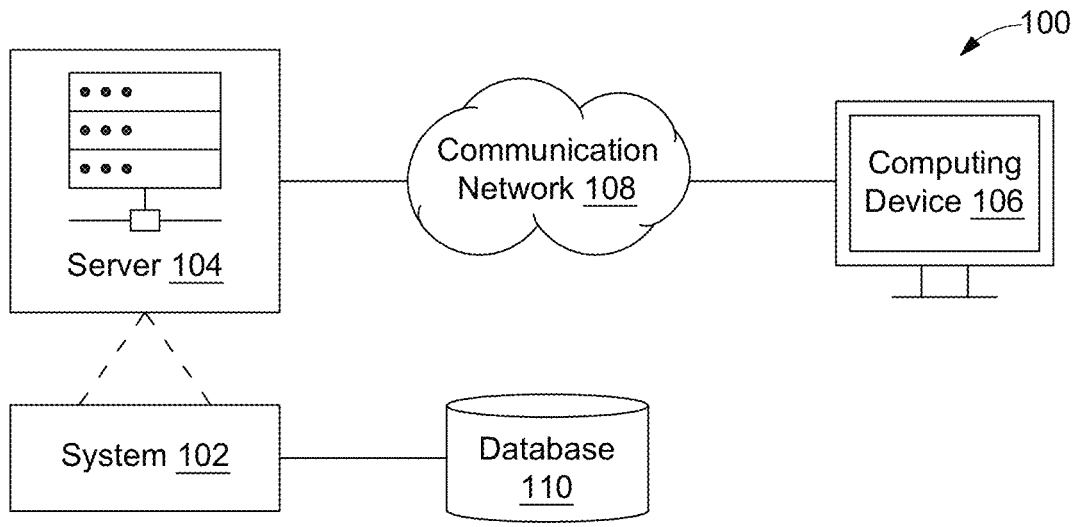
FIG. 1 illustrates a block diagram of an environment for dynamically mitigating threats of a generative Artificial Intelligence (AI) model, in accordance with embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Generative Artificial Intelligence (AI), which includes models like Generative Pretrained Transformer (such as GPT-3, GPT-3.5, GPT-4, and versions thereof), enables machines to produce human-like text, images, and other content. Generative AI models can generate creative and coherent content, making them valuable tools for a wide range of applications, from content generation to natural language understanding. However, their capabilities have also raised significant concerns in various domains, particularly in terms of safety, ethical issues, and risks associated with their use. Some of such concerns includes prompt injection, jailbreak scenario, toxicity, privacy, Intellectual property (IP) leakage violations, hallucinations, security attacks, sensitive information leakage threat, and so on.

The prompt injection is a cyberattack method aimed at large language models and generative AI systems/models. In these attacks, attackers cleverly mask harmful inputs as valid prompts, tricking the AI system into executing actions it's not supposed to, such as revealing confidential information, propagating false information, or producing unsuitable content. This susceptibility exists because the prompts given to the generative AI models and the inputs from the user are both in the same format, for example in natural-language text strings. Consequently, the generative AI system may not be able to differentiate between commands and input based solely on the data type. This makes it challenging to reliably detect harmful commands, presenting a substantial hurdle for the security of the AI system.

'Jailbreaking' in the context of AI models refers to the process of bypassing or disabling the built-in restrictions and controls of an AI system (or AI model). This is often done to unlock functionalities that are not intended by the developers or to manipulate the AI model's behavior. The harmful consequences of jailbreaking AI models may be significant. It can lead to unauthorized access to sensitive data, misuse of the AI model for malicious purposes such as generating fake content or spam, and it can also compromise the integrity and reliability of the AI model. Furthermore, jailbreaking can undermine the safety measures put in place to prevent bias, discrimination, or unethical use of AI technology, potentially causing harm to individuals or groups and eroding trust in AI models.

Toxicity in AI models is a significant threat that refers to the generation or reinforcement of harmful, offensive, or inappropriate content by an AI system. This can manifest in various forms, such as hate speech, biased statements, or the perpetuation of stereotypes. The threat arises when AI models are trained on datasets that contain toxic language or when such models learn from interactions with users who exhibit such behavior. The consequences of toxicity in AI are far-reaching. For example, it can cause emotional distress, reinforce negative societal biases, and diminish the credibility and trustworthiness of AI systems. Toxicity poses a serious risk, especially in applications like content moderation, where the AI is used to filter out harmful or offensive content. Addressing toxicity is crucial to ensure that AI models are safe, respectful, and promote positive interactions.

In AI systems, another threat is towards privacy as AI systems often process vast amounts of personal data to function effectively. The risk lies in the potential for this data to be mishandled, either unintentionally through inadequate security measures or intentionally through malicious attacks. AI models can inadvertently reveal personal information, learn and replicate sensitive patterns, or be exploited to gain unauthorized access to private data. This not only violates individual privacy rights but also poses a risk of identity theft, financial fraud, and personal safety.

Intellectual property (IP) violation in AI refers to the unauthorized use or reproduction of copyrighted material by AI systems. As AI models are trained on large datasets, they may inadvertently incorporate copyrighted content into their outputs, such as text, images, or music, leading to potential IP infringement. This issue is compounded by the difficulty in tracing the origins of data used in training AI models and the ease with which AI can generate derivative works. IP violations by AI can result in legal disputes, financial penalties, and damage to the reputation of the developers or organizations involved.

Hallucinations in AI models refer to instances where an AI system generates false or misleading information that is not grounded in reality or on the data it was trained on. This can occur due to overfitting, biases in the training data, or limitations in the AI model's understanding of context and factual accuracy. Hallucinations can lead to the spread of misinformation, reduce the trustworthiness of AI-generated content, and potentially cause harm if used in decision-making processes. It is a challenge for AI developers to minimize hallucinations by improving data quality, refining model architectures, and implementing robust validation techniques to ensure the reliability of AI outputs.

Profanity in AI models is an issue that arises when AI systems generate or fail to filter out offensive language. This can happen when models are trained on datasets containing profane words or phrases, leading them to learn and replicate such language in their outputs. The presence of profanity can make AI-generated content unsuitable for certain audiences, damage the reputation of the AI service provider, and undermine the user's trust in the system.

Generative AI systems introduce security risks due to their ability to create realistic and coherent content. These risks include advanced malware creation, phishing attacks, reverse engineering, and potential bypassing of CAPTCHA challenges.

Generative AI models, while powerful, can inadvertently leak sensitive information. When trained on large datasets, these models may inadvertently memorize specific examples, including private data. For instance, if an attacker can craft input prompts that trigger such memorization, it may lead to leak of sensitive information. The aforementioned concerns or threats in the generative AI models poses a risk to the widespread adoption and democratization of the generative AI, as they raise ethical, legal, and societal dilemmas.

The currently available threat detection methods and systems for detecting aforementioned threats pose a variety of technical challenges. For example, conventional systems are configured to subject an input data to various check for detection of the aforementioned threats in the data in a sequential manner. For example, the conventional systems may first check for presence of profanity threat followed by hallucination threat, which may then be followed by for example privacy check, and so on. Alternative known systems may perform sequential manner, but may follow a different sequence than the one mentioned here. Performing sequential pre-processing steps may add to the compute power needed for detection of the threats. In addition, performing checks for detection of all the types of threats may be unnecessary. For example, a generative AI model used for summarizing content for a non-personal or non-sensitive data may not need to perform check for profanity but may ensure that check for hallucination is performed. However, conventional systems may perform profanity and hallucination checks without determining the nature or attributed of the data being processed. Moreover, most of the available systems are configured to perform threat detection checks only in the input data. However, with the current advancements in the AI systems it is observed that such threats exist in output of the AI systems as well. Examples of such threats that may exist in the output data may include, but are not limited to, hallucinations, profanity, IP leakage and so on.

The disclosed embodiments overcome the aforementioned technical challenges in threat detection systems by leveraging a dynamic system and method that anticipates possible threats in the input data as well as the output data of generative AI models based on a multitude of factors including, but not limited to, nature of the input data, nature of the output data, usage history, and past violations, in real time. The disclosed system then dynamically configures a threat detection model to verify and mitigate such threats in a computationally efficient manner. Particularly, instead of directly performing multiple checks for detecting threats in a generative AI model (as in currently available systems), the disclosed system first identifies probabilities of occurrence/presence of threats in input and/or output data of the generative AI systems using macro classifiers, and subsequently verifies presence of such threats by using a variety of nano-classifiers exclusively trained to detect such threats.

Herein, macro classifiers are broad, high-level classifiers designed to identify general categories of threats within a data. Unlike nano classifiers, which are highly specialized and focused on detecting specific threat subtypes, macro classifiers provide an initial layer of defense by quickly sorting data associated with the data into broader threat categories. By employing macro classifiers, the system can efficiently filter out broad categories of threats, allowing more specialized nano classifiers to perform detailed analysis and mitigation on the identified threat subtypes. This hierarchical approach enhances the overall accuracy and efficiency of the threat detection process. It is appreciated that the human mind is not equipped to conceptualize and use the hierarchal structure of classifiers to dynamically configure a threat detection model given their digital interconnectedness, which goes beyond mere simple evaluations.

The disclosed system may not perform all the checks for threat detection for a data, instead it identifies the threat probabilities and thereafter selectively acts on sub-types of threats to mitigate them by dynamically generating a threat detection model. Hence, the system facilitates in saving time and compute power required for detection of such threats. In addition, the performance of the threat detection is not impacted. It will be pertinent to note that for any particular input and/or output data, the best suited and optimal configuration of the threat detection model is not pre-defined, instead the system dynamically generates such threat detection model based on multiple parameters associated with said data and identified sub types of threats in real-time.

As will be described in detail in the description below, the system first computes an initial threat level by assigning probability scores to detect the presence of threat and sub types of threats in the data and then iteratively works on mitigation until the threat probability scores fall below predefined threshold level. It is appreciated that the threat detection and mitigation approaches discussed herein improve the technical field of computer network performance by reducing processing usage and increasing system responsiveness.

FIG. 1 is a network implementation of a system 100 of a system 102 for detecting and dynamically mitigating threats of a generative Artificial Intelligence (AI) model, in accordance with an exemplary embodiment of the present disclosure.

The system 102 anticipates possible threats in data that may be input to or output from the generative AI model. The generative AI model may be referred to as a model designed to generate content or data (for example text, images, audio, video, codes or a combination thereof). The generative AI model has a capability to generate new and original content that may be used in various applications, such as content generation, creative tasks, data synthesis, and so on. The generative AI model uses machine learning techniques to generate the content. Examples of the generative AI model include, but are not limited to, a Generative Pretrained Transformer (GPT-3), a Large Language Model (LLM), a foundation model, a Generative Adversarial Network (GAN), a variational autoencoder (VAE), a Deep Belief Network (DBN), a Recurrent Neural Network (RNN). In some embodiments, the generative AI model may be an ensembled model.

Herein, the data may include flow of information that is processed by the system for threat detection and mitigation. The data may encompass various types of data formats and sources and it can be composed of input data entering the generative AI model as well as output data generated by the generative AI model. The data may include text data, audio data, video data, image data and combination thereof. For example, the text data may include sentences, paragraphs and other text-based information that may be entered by the user of generated by the generative AI model. The audio data may include voice commands, spoken words, and other sound recordings either input by users or generated by the generative AI model. The video data may include visual recordings live video feeds and generated animations or videos. The image data may include photographs graphics and other visual inputs or outputs. The input data may include messages typed by the users which the system 102 may continuously receive and process to detect any potential threats such as profanity or sensitive information. In an example, the output data may include responses generated by, for instance a chatbot, which are also monitored to ensure they do not contain inappropriate content or disclose sensitive information.

The system 102 determines probability of threat detection in the input and/or output data associated with the generative AI model. Based on such probability, the system 102 dynamically configures a threat detection model to verify and mitigate such threats in a computationally efficient manner. Particularly, instead of directly performing multiple checks for detecting threats in a generative AI model (as in currently available systems), the system 102 first identifies probabilities of occurrence/presence of threats in input and/or output data of the generative AI systems using macro classifiers, and subsequently verifies presence of such threats by using a variety of nano-classifiers exclusively trained to detect such threats. The macro classifiers categorize data into high-level, general classes. Examples of macro classifiers may include, but are not limited to, decision trees, random forests, and naive Bayes classifiers. The nano classifiers provide more specific categorization as they focus on finer distinctions within a broader class. Examples of nano classifiers may include, but are not limited to, support vector machines (SVMs), k-nearest neighbors (k-NN), logistic regression, and so on.

In an embodiment, the system 102 may be implemented on a server, for example a server 104. Although the present disclosure is explained considering that the system 102 is implemented on the server, it may be understood that the system 102 may also be implemented in a variety of computing devices 106, such as a laptop computer, a desktop computer, a notebook, a workstation, a cloud-based computing environment and the like. It will be understood that the system 102 may be accessed through one or more computing devices, such as the computing device 106. The computing device 106 may be communicatively coupled to the system 102 through a network 108.

The generative AI model may be used by entities or organizations, through an application hosted on the server 104 via an external device. Herein, the term application refers to a set of instructions or code that performs specific tasks or functions when executed. It can be a standalone program or part of a larger system. In the context of a server-hosted application, the application runs on a remote server and provides services or functionality to users over a network. Examples of the entities may include, but are not limited to, an individual, an organization, a system, a user, a developer, an institution, an Application Programming Interface (API), a data source, Internet of Things (IoT) devices, and the like. Examples of the external device may include, but are not limited to, a laptop, a desktop, a mobile phone, a smart wearable, and the like.

The server 104 may be communicatively coupled to a database such as a database 110, which may store information such as input data, output data, validated data, threat probability scores, pre-trained macro classifiers, pre-trained nano classifiers, and so on. The implementation of the pre-trained macro classifiers and the pre-trained nano classifiers by the system 102 are described further in the description below in subsequent sections. Herein, although the present disclosure is explained considering that the database is implemented in the server 104, it may be understood that the database may also be implemented in a variety of computing devices, such as the computing device 106.

The server 104 and the computing device 106 are configured to communicate with each other via the communication network 108 for sending and receiving various data. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The computing device 106 may include a display which further includes a user interface (not shown in FIG. 1). By way of an example, the display may be used to display data associated with the embodiments of present disclosure to the entities. Examples of such data may include but are not limited to, the input data, the output data, threat detection checks, threat scores, details of threat mitigating actions including information restriction on the input data and the output data, etc.

The system 102 may be configured for mitigating threats of the generative AI model. In some embodiments, the system 102 may receive data from the server 104 via the generative AI model. The data may be an input data that is input to the generative AI model. Additionally or alternatively, the data may be an output data that is output from the generative AI model. In various embodiments, the system 102 may send information associated with the data to the server 104. Such information may include, but is not limited to, types of threats and sub-types of threats in the data and threshold scores associated with threat types and sub-types, moderated data (such as moderated input data, or moderated output data), messages associated with threat detection and mitigation, details associated with the data that is moderated, and so on.

Further, for mitigating threats of the generative AI model, the system 102 may perform various operations. Such operations may include, but are not limited to, determining types of threats and sub-threats, computing threat probability scores, comparing the threat probability scores, moderating the data upon detecting threats types and sub-threat types, validating the moderated data, tracking telemetry status, and the like. Functions and implementation of system 102 are explained in detail in conjunction with FIG. 2.

Figure 2:
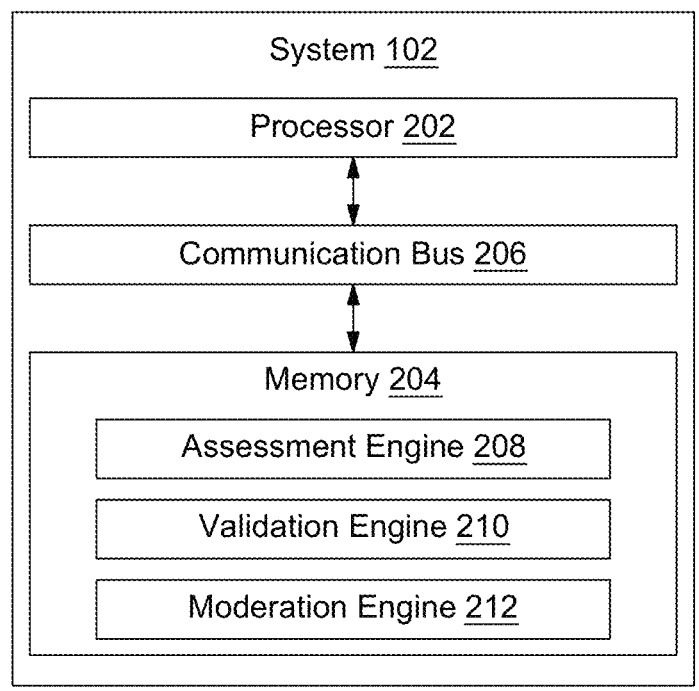
FIG. 2 is a block diagram of the system for detecting and dynamically mitigating threats of the generative AI model, in accordance with embodiments of the present disclosure.

FIG. 2 is a block diagram of the system 102 for detecting and dynamically mitigating threats of the generative AI model, in accordance with embodiments of the present disclosure. FIG. 2 is explained in conjunction with FIG. 1. In an embodiment, the system 102 may be embodied in the server 104. Alternatively, the system may be embodied in the computing device 106.

The system 102 may include one or more hardware processors, such as a processor 202, and a memory such as a memory 204 communicatively coupled to the processor 202 via a communication bus 206. The memory 204 may store data that may be captured, processed, and/or required by the system 102 or the computing device 106. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 may also store processor-executable instructions. The processor-executable instructions, when executed by the processor 202, may cause the processor 202 to implement one or more embodiments of the present disclosure such as, but not limited to, receive the data associated with a generative AI model, determine presence of types of threats in the data in real time, dynamically configure a threat detection model to detect sub-type of threats associated with the type of threats, selectively moderate the data to obtain moderated data and validating the moderated data to determine one of presence and absence of one or more sub-type of threats in the moderated data.

The memory 204 may include an assessment engine 208, a validation engine 210, and a moderation engine 212. The memory 204 may also include a data store or a database (not shown in FIG. 2) for storing various data and intermediate results generated by the engines 208-212.

In an embodiment, the system 102 may be configured to receive data associated with the generative AI model. The data may have one or more attributes. Examples of such attributes may include but are not limited to, nature of the input data, nature of the output data, usage history and context associated with the data, and similarity with past violations and threats. Herein, the 'nature of the input data' may refer to the modalities of the input data. For example, the input data may include text data, audio data, video data, image data and so on. The text data may include user comments or messages entered in a chat application. The audio data may include voice commands or recorded conversations. The video data may include live video feeds or recorded video content. The image data may include photos uploaded to a social media platform. The 'nature of the output data' may refer to the modalities such as text data, audio data, video data, image data and so on. For example, the output data may include text data, audio data, video data, image data and so on. The text data may include responses generated from a chatbot or AI assistant. The audio data may include synthesized speech from a text-to-speech system. The video data may include animations generated or edited video content. The image data may include AI-generated artwork or edited images.

The 'usage history' may include, for example, frequency of access of the data, patterns of interaction, past actions of a user and so on. Herein, frequency of access may refer to the number of times a particular type of data is accessed or processed. The patterns of interaction may refer to typical user behavior patterns, such as peak usage times. Past user actions may refer to historical data on user actions, like previous searches or commands. Herein, 'past violations' may include security breaches, policy violations, compliance failures, and so on. Herein security breaches may include instances where the system detected unauthorized access attempts. Policy violations may include records of users previously violating content policies, such as posting inappropriate content. Compliance failures may include historical data on non-compliance with regulatory requirements or internal policies.

The data, for example, the input data or the output data may include plurality of types of threats. Examples of such types of threats may include, but are not limited to, prompt injection, jailbreak scenario, toxicity, privacy, IP violations, hallucinations, privacy and security leaks, and so on. The processor 202 is configured to determine the types of threats from amongst the plurality of types of threats in the data in real time. Herein, determining the type of threats in real time may refer to achieving threat detection and mitigation with a latency of less than 100 milliseconds, utilizing processor 202 which may be a high-performance graphics processing units (GPUs) and tensor processing units (TPUs) for parallel processing, and implementing optimized machine learning algorithms for swift and accurate analysis. Efficient data handling techniques, such as buffering, caching, and asynchronous processing, may ensure continuous monitoring of the data and immediate threat identification and mitigation. Additionally, real-time communication protocols, like WebSockets and gRPC, may facilitate instant data transmission and processing, enabling the system 102 to maintain a constant data flow and execute threat detection and mitigation actions promptly, thereby protecting the integrity of the generative AI model's inputs and outputs.

The processor 202 may be configured to apply one or more macro classifiers to the data to determine the types of threats in the data. The macro classifiers are broad, high-level classifiers designed to identify general categories of threats within the data. Unlike nano classifiers, which are highly specialized and focused on detecting specific threat sub-types, macro classifiers provide an initial layer of defense from the threats by quickly sorting data into broader threat categories. These macro classifiers are trained using large, diverse datasets that encompass a wide range of examples for each threat category. The training process of the macro classifiers involves supervised learning techniques where the macro classifiers learn to distinguish between different types of threats based on patterns and features present in the data. For instance, a macro classifier may be trained to recognize general categories such as malicious content, sensitive information, and policy violations. A macro classifier for detecting malicious content may be trained on datasets containing, for example, various types of malicious inputs, such as attempts to inject harmful code or commands into a system. Said macro classifier may learn to identify features common to these threats, such as unusual patterns in text or code that deviate from normal usage. Similarly, a macro classifier for detecting sensitive information may focus on detecting potential leaks of personally identifiable information (PII) or intellectual property (IP). Training data for said macro classifier may include examples of PII such as social security numbers, addresses, and confidential business information, enabling the classifier to flag data containing such sensitive content. As another example, a macro classifier for detecting policy violations may be trained to detect content that violates organizational policies, such as hate speech, harassment, or inappropriate language. The training dataset for the macro classifier for detecting policy violations may include labeled examples of policy-violating content to help said macro classifier learn to recognize these patterns effectively.

The one or more macro classifiers may be configured by the processor 202 to compute a first threat probability score associated with a type of threat from amongst the plurality of types of threats. The macro classifiers may compute the first threat probability score based on the one or more attributes of the data. Examples of such attributes may include, but are not limited to, nature of the input data, nature of the output data, usage history and context of use-case associated with the data, similarity of said use case with known threats and violations, historical data associated with past violations of data being flagged, and so on. For example, if the data is a software code, then there may be little or no need of checking for profanities, instead the system 102 may determine the need to check the data for threats such as IP violation, and so on. On the other hand, in case the processor 202 may identify the context of the data as a marketing brief, said processor 202 may perform threat detection checks for hallucinations in the data. The processing 202 may identify the context of the data based at least on the attributes of the content of data, and determine one or more threats that have highest probability of occurrence in the data. Additionally or alternatively, the attributes may include plurality of predefined policies associated with the entity. The plurality of predefined policies may include, but are not limited to, data privacy policies, information security policies, code of conduct and ethics policies, acceptable use policies, IP policies, accessibility and inclusion policies, health and safety policies.

The system 102 processes the data by applying macro classifiers to detect broad categories of threats, and swiftly selects the most relevant nano classifiers trained to identify specific subtypes of threats. This selection and adjustment occur instantaneously, allowing the system 102 to compute threat probability scores for identified threats and compare them against predefined thresholds without delay.

On detection of one or more threats in the data by the macro classifiers, the system 102 dynamically configures a threat detection model to detect corresponding sub-types of threats in the data. The system 102 dynamically selects one or more nano classifiers corresponding to the macro classifiers from a database, computes threat probability scores for each of the one or more sub-types of threats using the nano classifiers, and detects threats based on the threat probability scores.

Herein, nano classifiers are specialized machine learning models trained to detect specific sub-types of threats in the data. For each threat type detected in the data, the system 102 is configured to select one or more nano classifiers by identifying the specific sub-types of threats. By way of examples and not limiting to the present embodiment, there may be specific sub-types of threats associated with any type of threat. For example, threat type 'Prompt Injection' may include threat sub-types such as code injection, SQL injection, command injection, and so on. Threat type 'Jailbreak' may include threat sub-types such as context manipulation, role play exploitation, and prompt engineering attacks. Threat type 'profanity' may include threat sub-types such as obscene language, hate speech, and inappropriate content. Threat type 'toxicity' may include threat sub-types such as harassment, bullying, and insults. Threat type Personally Identifiable Information (PII)' may include threat sub-types such as disclosure of social security numbers, credit card information, and contact information. Threat type Intellectual Property (IP) violation may include threat sub-types such as copyright infringement, trademark violation, and patent violation. Threat type organizational policy and role violation may include threat sub-types such as confidential information disclosure, non-compliance with regulations, and role-based access violations. Threat type hallucination may include threat sub-types such as fabricated information, unverified claims, and misinformation. Threat type bias and fairness may include threat sub-types such as racial bias, gender bias, and socioeconomic bias. Threat type security may include threat subtypes such as phishing attempts, malware distribution, and denial of service attacks.

Nano classifiers are pre-trained using supervised learning techniques. Each nano-classifier is trained on a dataset that includes examples of the specific subtype of threat it is designed to detect. Training a nano classifier for specific subtypes of threats involves creating highly specialized models tailored to identify specific patterns that corresponds to the respective subtypes of threats within a data. For instance, to train a nano classifier for the code injection threat subtype, a comprehensive dataset containing examples of benign code and malicious code snippets may be used. The training process labels each snippet as either safe or containing an injection attack, employing supervised learning techniques to teach the model to differentiate between the two. Similarly, for a social security number (SSN) disclosure threat subtype, the nano classifier may be trained using a dataset that includes text with and without SSNs. This training set covers various contexts in which SSNs might appear, enabling the nano classifier to learn to recognize specific numeric patterns and formats. For a racial bias threat subtype, the nano classifier is trained on a dataset containing examples of racially biased and unbiased text. The nano classifier learns to detect discriminatory language and sentiment by analyzing context, word choice, and sentence structure. In the case of a fabricated information threat subtype, the training data may include verified and unverified statements, teaching the nano classifier to spot inconsistencies, logical fallacies, and unsupported claims. Each nano classifier undergoes extensive training with datasets specifically designed to cover the nuances of its respective threat subtype, ensuring high accuracy and effectiveness in detecting these specific threats in real-time. This specialized training enables the dynamic threat detection model to swiftly and accurately respond to various detailed and specific threats as they occur.

The system 102 dynamically selects the appropriate nano classifiers based on the detected threat types. For example, if a macro classifier identifies a potential PII threat, the system 102 may select nano classifiers trained to detect various subtypes of PII threats, such as social security numbers, email addresses, or phone numbers.

Once the appropriate nano classifiers are selected, the system 102 computes second threat probability scores for each subtype of threat. The data, which may include text, audio, video, or image data, may be analyzed by the selected nano classifiers. Each nano classifier processes the data to identify patterns or features indicative of the specific threat sub-type. Nano classifiers extract relevant features from the data. For example, in the case of text data, features may include specific words, phrases, or sentence structures. For image data, features may include specific patterns, objects, or facial expressions. Each nano classifier computes a second threat probability score based on the extracted features. The second threat probability score represents a likelihood that the data contains the specific sub-type of threat. For example, consider a nano classifier trained to detect toxicity threats in text data. The nano classifier may analyze a sentence such as "You're a terrible person" and extract features like negative sentiment and aggressive language. Based on these features, the nano classifier may compute a second threat probability score of 0.85, indicating a high likelihood of toxicity.

The system 102 may detect the subtypes of threats by comparing the computed second threat probability scores with predefined threshold values of the second threat probability score. Each second threat probability score is compared against a corresponding predefined threshold value. These corresponding predefined threshold values are predefined and set based on empirical data and expert judgment to balance sensitivity and specificity. For instance, a threshold of 0.7 may be set for toxicity threats, meaning any probability score above 0.7 indicates the presence of a toxicity threat.

On detecting the value of the computed second threat probability score greater than or equal to the predefined threshold score, the system 102 may flag the data as containing the specific subtype of threat. If, however, the second probability score is below the predefined threshold score, the data may be considered safe with respect to that particular threat subtype. For example, as in previous example, the toxicity second threat probability score of 0.85 exceeds the predefined threshold score of 0.7, leading the system 102 to flag the data as containing a toxicity threat. For another subtype, such as a PII threat, if the computed threat probability score is 0.65 and the predefined threshold score is 0.8, the system 102 may not flag the data for this threat.

In some embodiments, the one or more nano-classifiers may include a single classifier. For example, in a text-based chat application used by a diverse audience, a single nano classifier can be highly effective in maintaining a respectful environment by detecting and mitigating instances of profanity.

In some other embodiments, the one or more nano-classifiers may include an ensemble of nano-classifiers related systems that operate to ingest the input data and the output data. The ensemble of nano-classifiers may include one or more of machine learning models, deep learning models, transfer learning models, rule-based repositories, datasets and dictionaries, custom and finetuned models, knowledge database, Retrieval Augmented Generation (RAG) model, and so on. It will be noted that using by precisely adjusted and continuously improving nano classifiers, the system 102 implementing the several embodiments of the present disclosure is capable of predicting second threat probability scores and accurately classifying threats with high accuracy in real-time. As will be understood, using the ensemble of nano classifiers offers several technical benefits. These nano classifiers, when combined, reduce overfitting by leveraging diverse perspectives. They process large volumes of data, capturing different patterns and improving overall performance. Ensembles also provide robustness and stability, making them less sensitive to noisy data. Additionally, techniques like boosting can transform weak learners into strong ones. Moreover, model consensus within ensembles reinforces confidence in predictions, making them reliable.

As discussed above, the system 102 dynamically configures a threat detection model to identify and mitigate subtypes of threats associated with the generative AI model. Herein, dynamically configuring the threat detection model in real-time refers to the continuous, adaptive process of adjusting the model's parameters and selecting appropriate macro classifiers to identify types of threats as such types of threats occur in the data. Such dynamic configuration is crucial for handling the evolving landscape of potential threats, as it enables the system 102 to respond to new and unforeseen types of malicious activities immediately in real-time. By operating in real-time, the system 102 ensures that any detected threats are promptly addressed, thereby maintaining the integrity and safety of the generative AI model's operations without interruption. This real-time dynamic configuration is essential for applications requiring immediate threat detection response, such as live content moderation, automated customer service, and other interactive AI-driven platforms.

In some embodiments, the system 102 is configured to enable learning of a set of emerging types of threats and a set of emerging sub-types of threats using reinforcement learning with human feedback (RHFL). Examples of such threats may include, but are not limited to, jailbreaks, prompt injections, accidental copyright infringement, extraction attacks to extract training data from large language models (LLMs), and so on.

Upon detecting the one or more threat sub-types in the data, the system 102 moderates the data based on one or more predefined rules corresponding to the detected sub-types of threats to generate moderated data. The moderation of the data is crucial in maintaining the integrity and safety of the data that is input to and/or output from the generative AI model. This moderation of the data ensures that the data is filtered and adjusted to mitigate identified threats, resulting in a moderated data that is safe and appropriate for the intended use. In various embodiments, the moderation engine 212 may selectively moderate the data to obtain the moderated data. In various embodiments, the moderation engine 212 selectively moderates the data based on one or more predefined rules corresponding to each of the one or more sub-type of threats. Herein, selectively moderating the data refers to applying predefined rules corresponding to specific subtype of threat(s) that are detected in the data using the nano classifiers. Such rules may be tailored to address the unique characteristics of each threat sub-type and can include actions such as filtering, rephrasing, masking, and more. Filtering involves removing or censoring portions of the data that may contain harmful content. For instance, if a profanity threat is detected in a text, the predefined rule may specify replacing profane words with asterisks or other symbols. For example, if the original text in the input data is "You are a terrible person!", the moderated text may be "You are a ****** person!". Rephrasing the data may modify the data to convey the same message in a safer manner. This may be particularly useful for threats like toxicity or racial bias. For example, in case the original text is "I hate your stupid ideas!", the moderated text may be "I strongly disagree with your ideas.". Masking of data may involve obscuring sensitive information to prevent disclosure of PII or IP. Masking may include replacing numbers or names with generic placeholders in the data. For example, in case the original text is "My social security number is 123-45-6789.", the moderated text may be "My social security number is [REDACTED].". In cases where the threat is contextual, such as role-based access violations, the system 102 may adjust the context in which information is presented. For example, in case a user attempts to access confidential information outside their role, the system 102 may redirect them to appropriate content or alert an administrator.

In some embodiment, automated responses may be triggered for certain threat sub-types. For instance, if an IP violation is detected, the system 102 may automatically send a notification to the relevant IP management team in the organization or the entity. For example, upon detecting a shared copyrighted image, the system 102 may trigger an alert to the legal department.

The system 102 may include a rule-based engine (not shown) is implemented to handle the application of predefined rules. The rule-based engine may continuously monitor the data and apply relevant rules whenever a threat subtype is detected. The rule-based engine may be configured with an extensive rule set that may cover various scenarios and threat subtypes, ensuring comprehensive moderation of the data.

The system 102 may be configured to track the telemetry status of the data to update the one or more nano classifiers, threat identification mechanisms, and organizational policies associated with the entity. Herein, the telemetry status may refer to continuous collection of data regarding the performance, behavior, and characteristics of the data as it is processed by the system 102 in real time. This data includes various metrics such as threat detection rates, false positives, false negatives, user interactions, and system performance indicators. The telemetry status provides valuable insights that can be used to update nano classifiers, threat identification mechanisms, and organizational policies.

The telemetry status can be used to update the one or more nano classifiers for performance monitoring and continuous learning. For instance, the telemetry data may monitor the performance of nano classifiers, tracking metrics such as detection accuracy, processing time, and the frequency of detected threats. As an example, if the telemetry data shows that a profanity detection nano classifier has a high false positive rate, where benign phrases are incorrectly flagged as offensive, this indicates a need for retraining the nano classifier with a more refined dataset. As another example, the telemetry data may reveal that new slang or emerging profane words are not being detected. This data may be used to update the training data set of the nano classifier, including these new terms, and retrain the nano classifiers to improve its accuracy.

The telemetry status can be used to update threat identification mechanisms. For instance, the telemetry data may help identify emerging patterns and trends in threats that may not have been previously accounted for. As an example, analysis of the telemetry data may indicate a rising trend in the use of sophisticated prompt injection attacks. This information may be used to develop new identification mechanisms specifically tailored to detect such complex threats. Additionally, the telemetry data may provide feedback on the efficiency of existing threat identification algorithms, highlighting areas for optimization. For example, the telemetry data may show that certain threat identification algorithms are slower during peak usage times. Developers may use this information to optimize the algorithms for better performance under high load conditions.

The telemetry status can be used to update organizational policies associated with the entity. For instance, the telemetry data may facilitate the system 102 to assess the effectiveness of current organizational policies in mitigating threats and maintaining system integrity. As an example, if the telemetry data indicates a high incidence of policy violations despite existing measures, it may suggest that current policies may be insufficient. This may prompt a review and strengthening of organizational policies. As new types of threats emerge, the telemetry data may guide the adaptation of organizational policies to address these threats proactively. As an example, the telemetry data may reveal an increase in the use of subtle bias in AI-generated content. In response, organizational policies may be updated to include specific guidelines and countermeasures to detect and mitigate bias. In an embodiment, the memory 204 may include a tracking engine (not shown in FIG. 2) that may be configured for continuously tracking telemetry status of the data to update threat detection mechanisms, threat identification mechanisms, and organizational policies.

The moderation engine 212 is configured to operate in real-time, allowing immediate intervention upon detection of the threat sub-type. The real-time moderation engine 212 may be crucial for various applications such as live content moderation on social media platforms, real-time chatbots, and so on. For example, during a live chat session, if a user types "You are an idiot!", the moderation engine 212 may instantly replace it with "You are incorrect.".

In some embodiments, the moderation engine 212 may iteratively moderate the data until the second threat probability score is determined to be less than the predefined threshold for each of the one or more threat sub-types. The iterative moderation of data may be integrated as a feedback loop to continuously refine and improve the predefined rules. The feedback loop may incorporate user feedback, expert reviews, and machine learning insights to update and optimize the rules. For example, if users frequently flag moderated content as still inappropriate, the rules may be adjusted to be more stringent.

The system 102 may be associated with an intuitive user interface (not shown) for administrators to configure and manage the predefined rules. The user interface may be configured within the system 102. Alternatively, the user interface may be configured outside the system 102 but communicatively coupled to the system 102. The user interface may enable easy updates, additions, and modifications to the predefined set of rules. For instance, the user interface may include an admin dashboard displaying current rules, recent moderation actions, and options to modify rules. For example, for profanity threat, the user interface may indicate threat types, predefined rule and action taken, as below:

Detected Threat: Profane language in a user comment.
Predefined Rule: Replace profane words with asterisks.
Action: Original text: "This is a f*ing disaster!"→Moderated text: "This is a **ing disaster!"

As another example, for PII disclosure threat, the user interface may indicate threat types, predefined rule and action taken, as below:

Detected Threat: Disclosure of a phone number in a message.
Predefined Rule: Replace phone numbers with "[REDACTED]".
Action: Original text: "Call me at 555-123-4567."→Moderated text: "Call me at [REDACTED]."

In yet another example, for toxicity threat, the user interface may indicate threat types, predefined rule and action taken, as below:

Detected Threat: Aggressive language in feedback.
Predefined Rule: Rephrase aggressive statements.
Action: Original text: "Your work is garbage!"→Moderated text: "Your work needs improvement."

As still another example, for racial bias threat, the user interface may indicate threat types, predefined rule and action taken:

Detected Threat: Racially biased comment.
Predefined Rule: Remove biased statements and provide educational prompt.
Action: Original text: "People from [race] are always lazy."→Moderated text: "[Removed for bias] Please ensure respectful language."

The moderation engine 212 may effectively moderate the data, ensuring that the moderated data is safe and appropriate for the intended audience, thereby maintaining the integrity and reliability of generative AI models in various applications.

In certain instances, the moderated data may still contain threats, and thus needs to be validated. The validation engine 210 may be communicatively coupled to the moderation engine 212, and in conjunction with the processor 202, the validation engine 210 may validate the moderated data (i.e., the moderated input data and/or the moderated output data). To validate the moderated data, the validation engine 210 may iteratively compute the second threat probability score, via the one or more nano classifiers, for each of the one or more sub-types of threats in the moderated data and compare the computed second threat probability score with the predefined threshold value of the second threat probability score. The moderation engine 212 may iteratively moderate the moderated data, until the second threat probability score is determined to be less than the predefined threshold value of the second threat probability score. The second threat probability score being less than the predefined threshold value is indicative of absence of the one or more sub-types of threats in the moderated data. Once the data is validated to be devoid of threat sub-types, the system 102 may render details of such validation on the interactive user interface (UI). It will be noted that the data may be validated to be devoid of threat sub types either after moderation or without moderation.

In some embodiments, the system 102 may perform a predefined number of iterations of computing the second threat probability scores for the threat sub-types and compares such second threat probability scores with respective predefined threshold values. In case the system 102 determines the second threat probability score to be greater than or equal to the predefined threshold value of the second threat probability score for the predefined number of iterations, the system 102 may stop/restrict moderating the moderated data. In response, the system may display a notification on the user interface of the computing device to indicate to the user that the moderated data still included threats, kind of threats, and other such information. Additionally or alternatively, the system 102 may include notification on the UI indicative of stopping/restricting moderating the moderated data upon the predefined number of iterations of moderating the moderated data.

In some embodiments, when the data is determined to include threat sub-types, the system 102 is configured to identify the at least a portion/section of the data that may include content with the data or the moderated data having such sub-types of threat. In an embodiment, the system 102 may encapsulate such portion(s)/section(s) of the data or the moderated data prior to processing or displaying the data or the moderated data. For example, on determination of the threat sub-types in the input data or the moderated input data, the system 102 may identify specific portions of the input data and/or the moderated input data, and encapsulate such portions prior to subsequent processing of the such data by the generative AI model. In case the system 102 identifies presence of the threat sub-types in the output data or the moderated output data, the system 102 may identify specific portions of the output data and the moderated output data, and encapsulates such portions prior to displaying the output data or the moderated output data on the display of the computing device.

Figure 3:
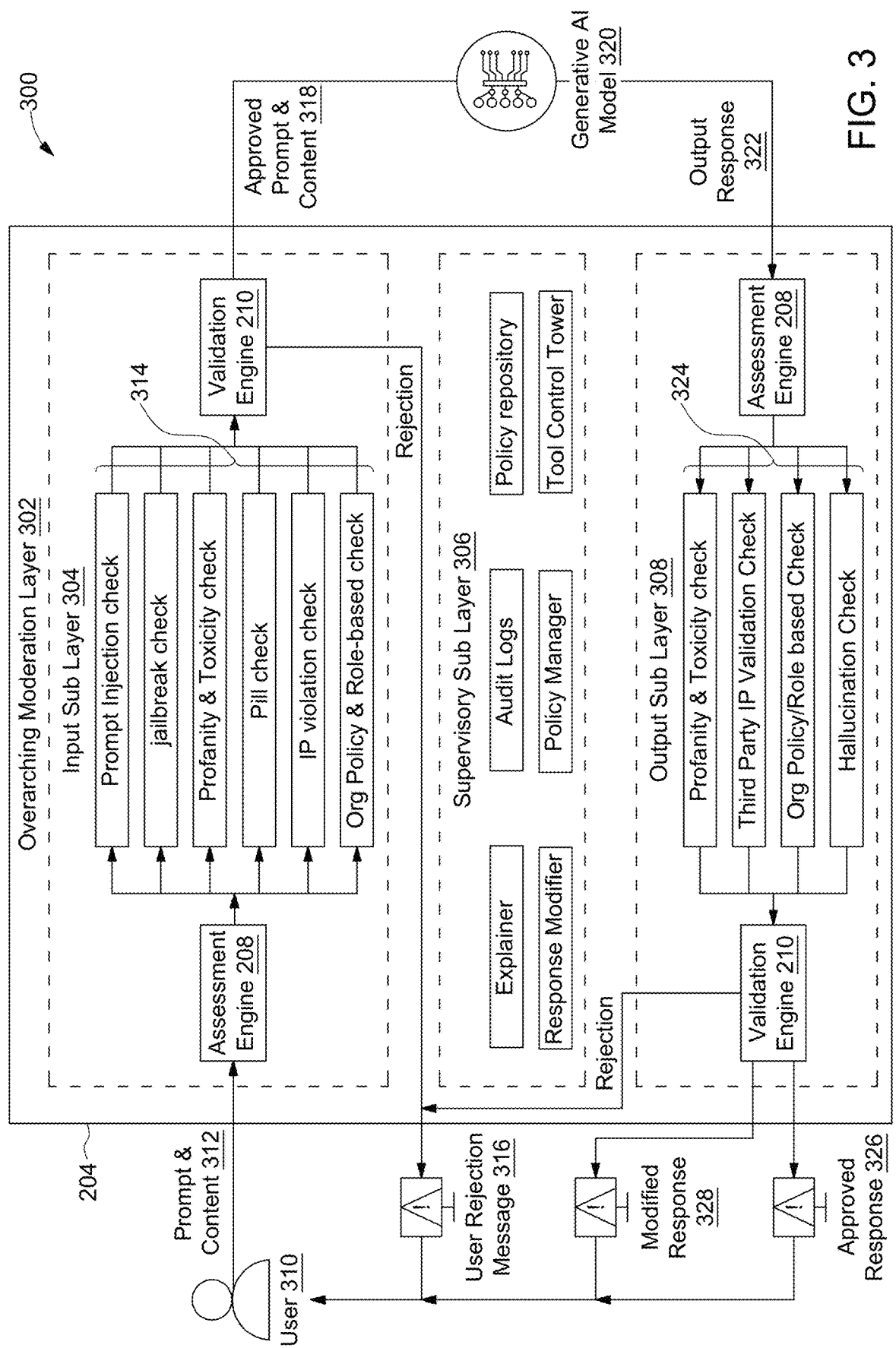
FIG. 3 illustrates a functional block diagram of various engines within a memory of a computing device configured for dynamically mitigating threats of a generative Artificial Intelligence (AI) model, in accordance with embodiments of the present disclosure.

FIG. 3 is a functional block diagram 300 of various engines within the memory 204 of the computing device 106 configured for dynamically mitigating threats of the generative AI model, in accordance with embodiments of the present disclosure. FIG. 3 is explained in conjunction with FIGS. 1-2. As illustrated in FIG. 3, the system 102 may include an overarching moderation layer 302. In an embodiment, the overarching moderation layer 302 may be stored in the memory 204 of the system 102. The overarching moderation layer 302 may further include sub-layers, such as an input sub-layer 304, a supervisory sub-layer 306, and an output sub-layer 308. Each of the input sub-layer 304 and the output sub-layer 308 includes an assessment engine, for example the assessment engine 208 and a validation engine, for example the validation engine 210.

Consider a scenario where a user 310 provides an input (for example, a prompt and content 312) to the generative AI model. The input may be further processed to the input sub-layer 304 of the memory 204. The assessment engine 208 associated with the input sub-layer 304 may perform various operations on the prompt and content 312. As already explained in FIG. 2, for example, the assessment engine 208 may determine an intent and category of the prompt and content 312 based on the attributes of the data to detect threats associated with the prompt and content 312. The threats may include a prompt injection check, a jail-break check, a profanity and toxicity check, a Personal Identifiable Information (PII) check, an Intellectual Property (IP) violation check, and an organization policy and a role-based check. The assessment engine 208 may determine a first threat probability score corresponding to each of the types of threats for the prompt and content 312, based on the attributes of the data. The assessment engine 208 may compare the first threat probability score with a predefined threshold score for the each of the types of threats. In case, the first threat probability score of the one or more types of threats is determined to be greater than the predefined threshold score, the assessment engine 208 may further dynamically configure a threat detection model to detect one or more sub-type of threats associated with the one or more type of threats.

As described in FIGS. 2-3, the assessment engine 208 dynamically configures the threat detection model by selecting one or more nano classifiers from amongst a plurality of nano classifiers 314 selectively trained to detect the one or more sub-type of threats in the data. The assessment engine 208 computes a second threat probability score for each of the one or more sub-types of threats by the one or more nano classifiers. In an embodiment, the one or more nano classifiers may be selected based on the aforementioned comparison and a plurality of predefined policies associated with the user 310. The assessment engine detects the one or more sub-types of the threats in the data based on a comparison of the second threat probability score with a predefined threshold value of the second threat probability score, wherein the second threat probability score being greater than or equal to the predefined threshold value of the second threat probability score for a sub-type of threats from amongst the plurality of threats is indicative of a presence of sub-type of threat in the data.

On detection of subtypes of threats, the data is selectively moderated based on predefined rules corresponding to each of the one or more sub-type of threats to obtain a moderated data.

The validation engine 210 associated with the input sub-layer 304 may perform validation of the moderated data to determine presence or absence of the sub types of threats. The validation may be a successful validation on determination of absence of sub-types of threats in the data or the moderated data. However, the validation may be unsuccessful validation on detection of presence of at least one of the sub types of threats in the data or the moderated data. In an embodiment, if the validation is unsuccessful or when the prompt and content 312 fails at least one of the one or more threat detection, a moderation engine (not shown in FIG. 3) associated with the input sub-layer 304 and configured within the memory 204, iteratively moderates the prompt and content 312 until the threat score is less than or equal to the predefined threshold score for each of the types of threats.

In some embodiments, the moderating engine may be configured within the supervisory sub-layer 306 and associated with the input sub-layer 304 and the output sub-layer 308. The display of the prompt and content 312 may be restricted on the UI upon attaining a predefined number of unsuccessful iterations of moderating the prompt and content 312. For example, when the validation of the prompt and content 312 is unsuccessful even after performing some predefined iterations of moderation, the prompt and content 312 may be restricted from further processing, and details of restricting the prompt and content 312 (such as a user rejection message 316) may be transmitted and rendered to the user 310.

If the validation is successful (after moderation or without moderation), an approved prompt and content 318 may be transmitted to a generative AI model 320. The approved prompt and content 318 may be directly approved prompt and content without moderation or modified prompt and content. The generative AI model 320 may generate output data (such as an output response 322). The output response 322 may be sent to the output sub-layer 308 of the computing device 106. The assessment engine 208 associated with the output sub-layer 308 may perform various operations for mitigating threat types of the output response 322, if present. The assessment engine 208 may analyze the output response 322 to determine an intent and a category of the output response 322 based on the attributes of the output response 322. The assessment engine 208 may identify one or more sub types of threats 324 associated with the output response 322 based on the analysis of the output response 322. The one or more sub types of threats 324 may include the profanity and toxicity check, a third-party Intellectual Property (IP) violation check, the organization policy and role-based check, and a hallucination check.

The assessment engine 208 may further determine, in real-time, a threat score corresponding to each of the sub types of threats 324, for the output response 322 received via the generative AI model 320, based on the plurality of attributes. Once the threat score is determined for each of the sub types of threats 324, the threat probability score may be compared with a predefined threshold for the threshold value of the second threat probability score, by the assessment engine 308. Further, the assessment engine 308 may select one or more sub types of threats, based on the comparison and a plurality of predefined policies associated with the user 310. It should be noted that the threat probability score of the each of the one or more sub types of threats is greater than the predefined threshold probability score.

On detection of subtypes of threats, the output data is selectively moderated based on predefined rules corresponding to each of the one or more sub-type of threats to obtain a moderated output data.

The validation engine 210 associated with the output sub-layer 308 may perform validation of the moderated data to determine presence or absence of the sub types of threats. The validation may be a successful validation on determination of absence of sub types of threats. However, the validation may be unsuccessful validation on detection of presence of at least one of the sub types of threats. In an embodiment, if the validation is unsuccessful or when the output response 322 fails at least one of the one or more threat detection, a moderation engine (not shown in FIG. 3) associated with the input sub-layer 304 and configured within the memory 204, iteratively moderates the output response 322 until the threat score is less than or equal to the predefined threshold score for each of the types of threats. In some embodiments, the moderating engine may be within the supervisory sub-layer 306 and associated with the input sub-layer 304 and the output sub-layer 308. The display of the output response 322 may be restricted on the UI upon attaining a predefined number of unsuccessful iterations of moderating the prompt and content 312. For example, when the validation of the output response 322 is unsuccessful even after performing some predefined iterations of moderation, the output response 322 may be restricted from further processing, and details of restricting the output response 322 (such as a user rejection message 316) may be transmitted and rendered to the user 310.

If the validation of the output response 322 is successful without moderation, an approved response 326 may be transmitted to the user 312 through the generative AI model 320. The approved response 326 may be the output response without any moderation. Otherwise, if the validation of the output response 322 is successful after moderation, a modified response 328 may be transmitted to the user 312 through the generative AI model 320.

Further, the supervisory layer 306 may provide telemetry status and of the computing device 106. The supervisory layer 306 may include components, such as an explainer, audit logs, a policy repository, a response modifier, a policy manager, and a tool control tower. The explainer may be responsible for providing transparency and interpretability to the generative AI model's actions and decisions. It helps explain why the generative AI model 320 generates certain outputs, making it easier for the user 310, developers, or auditors to understand reasoning and behavior. The audit logs may be records of events and activities within the generative AI model 320. The audit logs capture and store data such as user interactions, responses, and any significant events or changes. The audit logs are essential for tracking system behavior, monitoring for anomalies, and investigating incidents or issues, and may be valuable for compliance and accountability purposes.

The policy repository is a storage location for the plurality of predefined policies, rules, and guidelines that the generative AI model 320 may follow. These policies define acceptable behaviors, security measures, and ethical standards that the generative AI model 320 may adhere to. The policy repository helps ensure that policies are consistently applied and may be updated or managed efficiently. The response modifier may be responsible for making real-time adjustments to AI generated outputs (such as the output response 322). If an AI response violates a policy or standard, the response modifier may intervene to correct or modify the output to align with a desired criteria. This is particularly important for ensuring that outputs comply with ethical, legal, or quality standards. In some embodiments, the response modifier may correspond to the moderating engine.

The policy manager may oversee administration and enforcement of policies. The policy manager may be responsible for configuring, updating, and monitoring the policies in the policy repository. The policy manager ensures that the policies are consistently applied and that any necessary adjustments are made as the organization's requirements evolve. The tool control tower may be a centralized control point or interface for managing and monitoring entire system and provide administrators with a comprehensive view of the generative AI model's performance, including its adherence to policies, responses, and any required modifications. The tool control tower facilitates system oversight and ensures that the generative AI model operates effectively and safely.

The computing device 106 may mitigate risks associated with generative AI technology. The memory 204 of the computing device 106 includes the supervisory layer 306 that manages the checks and validation processes to ensure safe and compliant AI operations, including real-time threat anticipation, dynamic architecture, and a diverse library of tools. The computing device 106 adapts checks based on the nature of data and utilizes reinforcement learning for continuous improvement. The computing device 106 provides transparency through explainability. The computing device 106 may be applicable to various industries, particularly in sensitive sectors like finance and healthcare. A process associated with the operations of the computing device 106 includes preliminary screening, threat assessment, check sequence generation, iterative validation, and output processing before presenting results to users.

Figure 4:
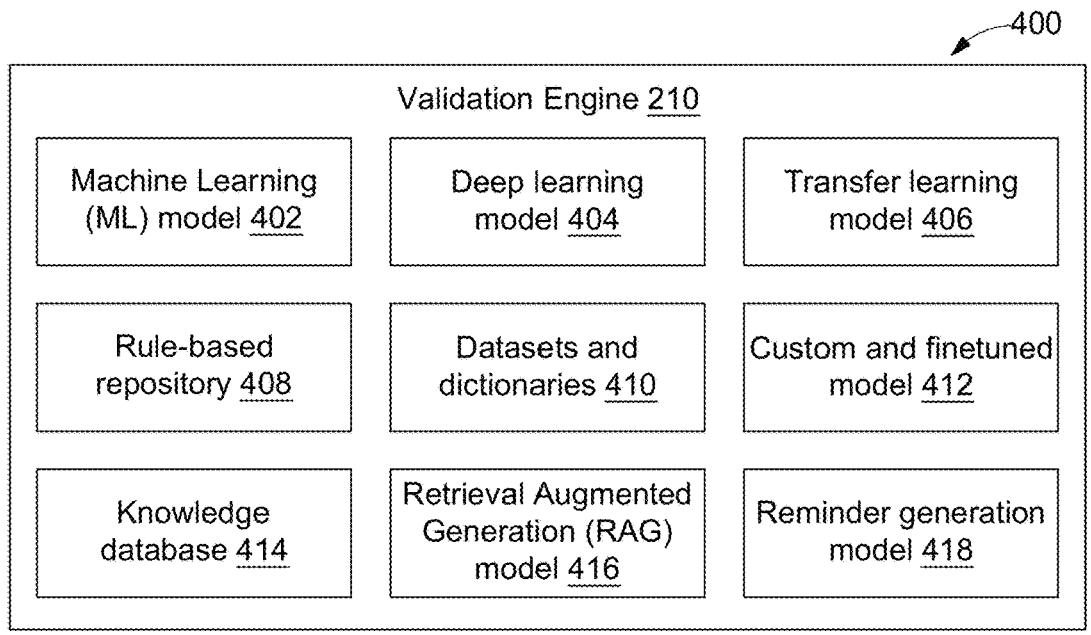
FIG. 4 illustrates a block diagram of various components of a validation engine, in accordance with embodiments of the present disclosure.

FIG. 4 is a block diagram 400 of various components of the validation engine 210, in accordance with an exemplary embodiment of the present disclosure. FIG. 4 is explained in conjunction with FIGS. 1-3. The validation engine may include one or more nano classifiers configured to detect the sub types of threats. The one or more nano classifiers may include at least one of the one or more Machine Learning (ML) models 402, one or more deep learning models 404, one or more transfer learning models 406, one or more rule-based repositories 408, one or more datasets and dictionaries 410, one or more custom and finetuned models 412, one or more knowledge database 414, one or more Retrieval Augmented Generation (RAG) models 416, and a reminder generation model 418. Herein, the reminder generation model is configured to provide self-reminders to the computing device for the purpose of threat mitigation. For instance, the computing device may append reminders such as "You have to answer ethically and safely" in each input data so that the Generative AI model that may be protected may not deviate. The validation engine 210 may select one or more of the nano classifiers based on the threat score to detect sub types of the threats.

It should be noted that all such aforementioned engines 208-212 may be represented as a single module or a combination of different modules. Further, as will be appreciated by those skilled in the art, each of the engines 208-212 may reside, in whole or in parts, on one device or multiple devices in communication with each other. In some embodiments, each of the engines 208-212 may be implemented as dedicated hardware circuit comprising custom application-specific integrated circuit (ASIC) or gate arrays, off-the-shelf semiconductors such as logic chips, transistors, or other discrete components. Each of the engines 208-212 may also be implemented in a programmable hardware device such as a field programmable gate array (FPGA), programmable array logic, programmable logic device, and so forth. Alternatively, each of the engines 208-212 may be implemented in software for execution by various types of processors (e.g., the processor 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for dynamically mitigating threats of the generative AI model. For example, the exemplary computing device 106 may mitigate the threats of the generative AI model by the processes discussed herein. In particular, as will be appreciated by those of ordinary skill in the art, control logic and/or automated routines for performing the techniques and steps described herein may be implemented by the computing device 106 either by hardware, software, or combinations of hardware and software. For example, suitable code may be accessed and executed by the one or more processors on the computing device 106 to perform some or all of the techniques described herein. Similarly, application specific integrated circuits (ASICs) configured to perform some or all of the processes described herein may be included in the one or more processors on the computing device 106.

Figure 5:
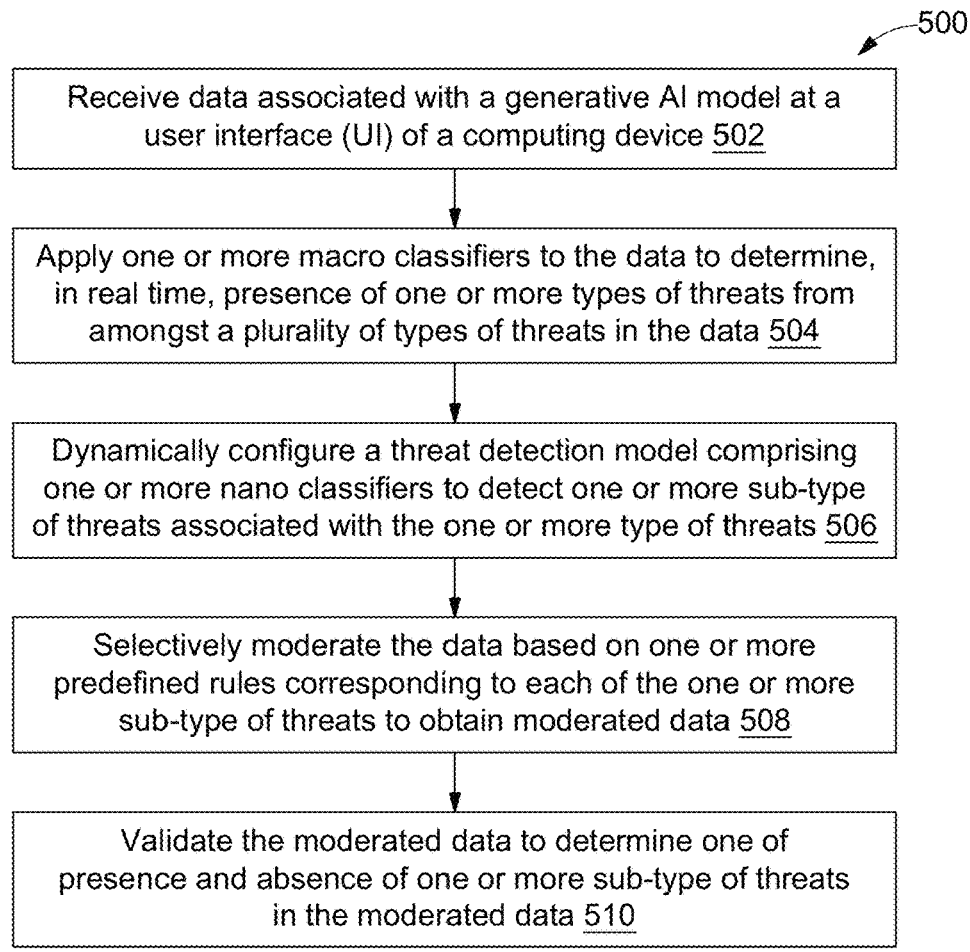
FIG. 5 illustrates a flow diagram of a method for dynamically mitigating threats of a generative Artificial Intelligence (AI) model, in accordance with embodiments of the present disclosure.

FIG. 5 illustrates a flow diagram of a method 500 for dynamically mitigating threats of a generative Artificial Intelligence (AI) model, in accordance with embodiment of the present disclosure. FIG. 5 is explained in conjunction with FIGS. 1-4. The method 500 depicted in the flow chart may be executed by a system, for example, the computing device 102 of FIG. 1. In an example embodiment, the system 102 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 500 are described with help of the computing device 106. However, the operations of the method 500 can be described and/or practiced by using any other system.

The disclosed method relates to detection and mitigation of threats in the input data and the output data of the generation AI models. A threat may be one of a prompt injection threat, a jailbreak threat, a profanity threat, a toxicity threat, a Personal Identifiable Information (PII) leakage threat, an Intellectual Property (IP) violation threat, an organization policy and role-based threat, a hallucination threat, security attacks, and sensitive information leakage threat. The method 500 ensures the safety and reliability of the AI's operations by employing a structured process having detailed steps, as described below.

At step 502, the method 500 includes receiving data associated with a generative AI model at a user interface (UI) of a computing device. The data may include multi-modal data. For example, the data may be an input data, such as user-provided text, audio, video, or image data, or an output data generated by the generative AI model. For example, in a text-based chat application, the input data may include text messages typed by users, while the output data may include responses generated by the AI chatbot.

At step 504, the method 500 includes determining, in real time, presence of one or more types of threats from amongst a plurality of types of threats in the data. In an embodiment, the system 102 applying one or more macro classifiers to the data to determine the presence of types of threats in the data in real-time. As previously discussed, each macro classifier of the one or more macro classifiers is capable of computing a threat probability score associated with a type of threat from amongst the plurality of types of threats. Herein, macro-classifiers refers broad classifiers trained on extensive datasets to identify general categories of threats, such as profanity, sensitive information disclosure, or malicious content. For example, a macro classifier processes an incoming message "You are an idiot, and this is a f***ing disaster" and identifies potential threats like profanity and toxicity.

Herein, the macro classifiers compute the threat probability score based on one or more attributes associated with the data. Each of the one or more attributes includes one of nature of the input data, nature of the output data, usage history and context associated with the data, and similarity with past violations and threats. It some embodiments, the attributes may be configured based on the plurality of predefined policies associated with an entity. The entity may include, but is not limited to, an individual, an organization, a system, a user, a developer, an institution, an Application Programming Interface (API), a data source, Internet of Things (IoT) devices.

At step 506, the method 500 includes dynamically configuring a threat detection model to detect one or more sub-type of threats associated with the one or more type of threats. The method for dynamically configuring the threat detection model includes selecting, from a database, one or more nano classifiers from amongst a plurality of nano classifiers selectively trained to detect the one or more sub-type of threats in the data. Herein the nano classifiers are specialized classifiers trained on specific threat subtypes. For instance, a nano classifier for profanity detection is trained on datasets containing various forms of profane language. Thus, if the macro classifier identifies a potential profanity threat, the system 102 may select a nano classifier specialized in detecting sub type of profanity threat.

A second threat probability score is computed for each of the one or more sub-types of threats by the one or more nano classifiers. The nano classifiers analyze features of the data, such as word patterns or speech tones etc., to compute the threat probability scores. For example, the nano classifier may detect the word "f***ing" in the message and may compute a profanity threat probability score of 0.95.

The one or more sub-types of the threats are detected in the data by the threat detection model. The sub-types of threats may be determined based on a comparison of the second threat probability score with a predefined threshold value of the second threat probability score. In some embodiments, the predefined threshold value may be set based on empirical data to balance detection sensitivity and specificity. In the above example, in case the computed profanity threat probability score of 0.95 exceeds the predefined threshold of 0.7, the presence of profanity may be confirmed.

At step 508, the method 500 selectively moderating the data based on one or more predefined rules corresponding to each of the one or more sub-type of threats to obtain a moderated data. This moderation may involve, for example, filtering, rephrasing, or masking content to ensure it is safe and appropriate. In some embodiments, specific rules may be defined for each threat subtype to guide the moderation process. For example, the system may replace the profane word "f*ing" with "", resulting in the moderated message: "You are an idiot, and this is a ** disaster."

The moderated data is re-evaluated iteratively to ensure that all instances of the detected threat subtypes have been appropriately mitigated. At step 510, the method 500 includes validating the moderated data to determine one of presence and absence of one or more sub-type of threats in the moderated data. In some embodiments, the threat detection model may determine if the second threat probability scores for the moderated data fall below the predefined thresholds. If necessary, the moderation and validation process is repeated until the moderated data is free of detected threats. For example, the system 102 may re-evaluate the moderated message and confirms that the profanity threat probability score is now below the threshold.

In various embodiments, the moderated data is validated by computing the second threat probability score for each of the one or more sub-types of threats in the moderated data. The second threat probability score is compared with the predefined threshold value of the second threat probability score. The moderated data is further moderated until the second threat probability score is determined to be less than the predefined threshold value of the second threat probability score. As will be understood, the second threat probability score being less than the predefined threshold value is indicative of absence of the one or more sub-types of threats in the moderated data. If the second threat probability score remains above the predefined threshold for a predefined number of iterations, the system limits/restricts further moderation attempts and renders details of restricting the data on a user interface. Additionally or alternatively, the system may render the restricted data on the UI. The system implements this a mechanism to prevent infinite loops in moderation attempts, thereby ensuring efficiency. For example, if after three iterations, if the profanity threat score remains high, the system stops further moderation and may optionally alert the user or administrator.

Telemetry data from the moderation process is used to update nano classifiers, threat identification mechanisms, and organizational policies. For example, the telemetry data indicates a rise in new slang terms. The profanity detection nano classifier is retrained with updated datasets, and organizational policies are adjusted to address these new threats. Telemetry data may include metrics such as, but not limited to, detection accuracy, false positives, and false negatives that are collected and analyzed to refine the system. This continuous feedback loop ensures the system adapts to new threats and improves over time. In an embodiment, the system may learn a set of emerging types of threats and a set of emerging sub-types of threats using RHFL.

By way of an example, when a user enters the input data as "My social security number is 1234". In such a case, it may be identified that the input data includes sensitive information. Thus, the input data may be blocked or restricted from further processing as the input data includes PII information. The PII information is private and needs to be protected to prevent privacy breaches and identity theft. Further, details of restring the input data may be sent to the user. The user may be informed of the block or restriction and a reason for it. The user may receive a message explaining that the PII information, such as the social security number, may not be processed for security and privacy reasons.

By way of another example, consider a scenario where the user enters "name", "designation", and "social security number". It may be identified that the input data includes non-sensitive information such as "name" and "designation" and sensitive information such as "social security number". In such a case, the input data may be moderated to exclude the PII information from the input data, and the moderated data may be processed for generating a corresponding output data. In other words, instead of entirely blocking the input data, the input data may be moderated by excluding or masking the PII information. The non-sensitive parts of the input data, such as the name and designation, are retained for processing. The moderated input data, which now includes only non-sensitive information, may be processed to generate the corresponding output data. In some embodiments, an intended response or an action may be provided to the user based on non-PII information. Further, the user may be informed that certain information may be excluded or masked to protect their privacy. The user may receive a message explaining the moderation and its purpose. By moderating the input data to exclude PII while still processing rest of the input data, privacy may be maintained while providing a useful response.

Figure 6:
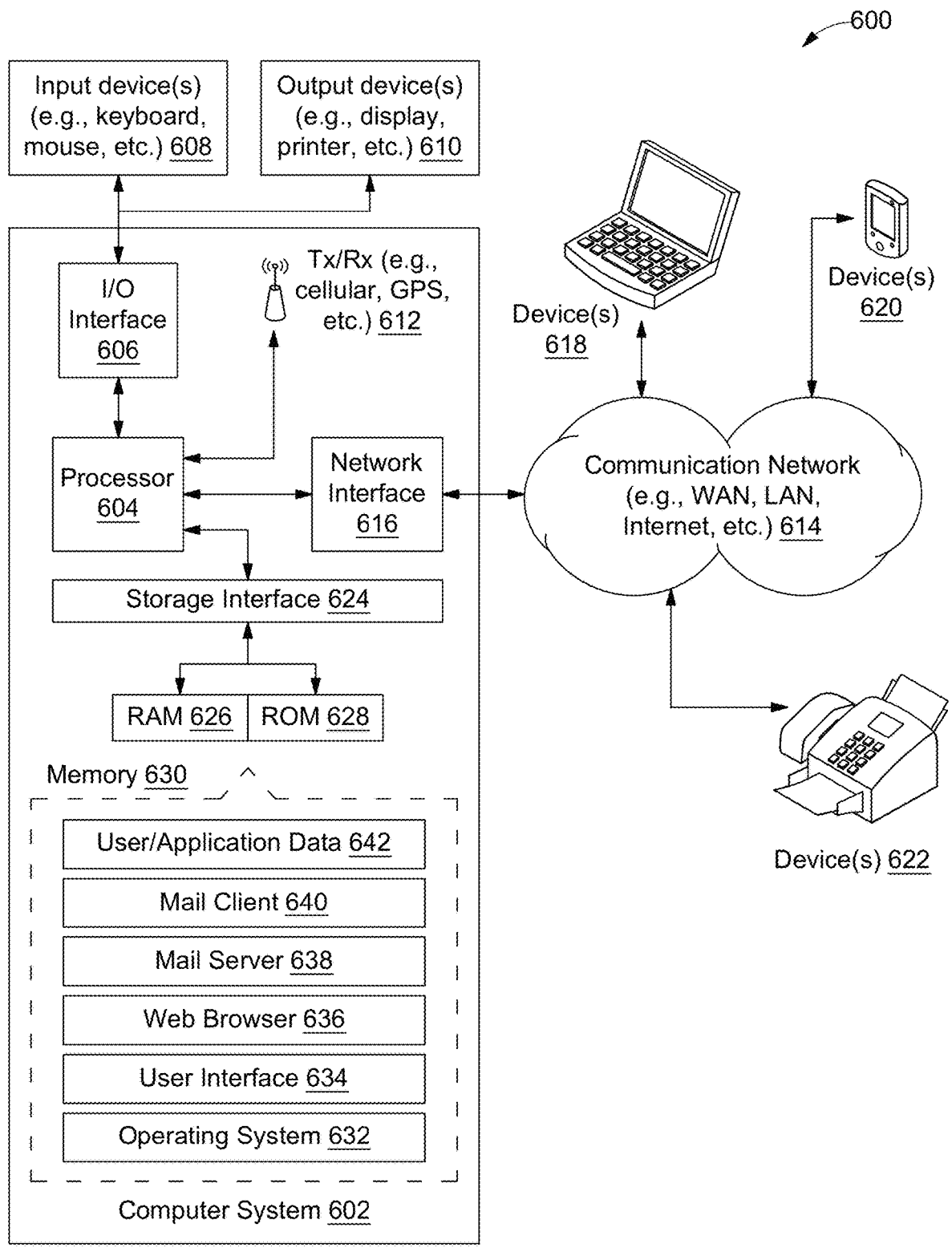
FIG. 6 illustrates a block diagram of an exemplary computer system for implementing embodiments consistent with the present disclosure.

The disclosed methods and systems may be implemented on a conventional or a general-purpose computer system, such as a personal computer (PC) or server computer. FIG. 6 is a block diagram that illustrates a system architecture 600 of a computer system 602 for determination of personality traits of agents in a contact center, in accordance with an exemplary embodiment of the present disclosure. Variations of computer system 602 may be used for implementing server #for determination of personality traits of agents in a contact center. Computer system 602 may include a central processing unit ("CPU" or "processor") 604. Processor 604 may include at least one data processor for executing program components for executing user-generated or system-generated requests. A user may include a person, a person using a device such as such as those included in this disclosure, or such a device itself. The processor 604 may include specialized processing units such as integrated system (bus) controllers, memory management control units, floating point units, graphics processing units, digital signal processing units, etc. The processor 604 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 604 may be disposed in communication with one or more input/output (I/O) devices via I/O interface 606. The I/O interface 606 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 602.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 606, the computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with the processor 604. The transceiver 612 may facilitate various types of wireless transmission or reception. For example, the transceiver 612 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 602.11a/b/g/n, Bluetooth, FM, global positioning system (GPS), 2G/3G HSDPA/HSUPA communications, etc.

In some embodiments, the processor 604 may be disposed in communication with a communication network 614 via a network interface 616. The network interface 616 may communicate with the communication network 614. The network interface 616 may employ connection protocols including, without limitation, direct connect, Ethernet (e.g., twisted pair 10/100/1000 Base T), transmission control protocol/internet protocol (TCP/IP), token ring, IEEE 602.11a/b/g/n/x, etc. The communication network 614 may include, without limitation, a direct interconnection, local area network (LAN), wide area network (WAN), wireless network (e.g., using Wireless Application Protocol), the Internet, etc. Using the network interface 616 and the communication network 614, the computer system 602 may communicate with devices 618, 620, and 622. These devices 618, 620, and 622 may include, without limitation, personal computer(s), server(s), fax machines, printers, scanners, various mobile devices such as cellular telephones, smart-phones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 602 may itself embody one or more of these devices.

In some embodiments, the processor 604 may be disposed in communication with one or more memory devices 630 (e.g., RAM 626, ROM 628, etc.) via a storage interface 624. The storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 630 may store a collection of program or database components, including, without limitation, an operating system 632, user interface 634, web browser 636, mail server 638, mail client 640, user/application data 642 (e.g., any data variables or data records discussed in this disclosure), etc. The operating system 632 may facilitate resource management and operation of the computer system 602. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 634 may facilitate display, execution, interaction, manipulation, or operation of program components through textual or graphical facilities. For example, user interfaces may provide computer interaction interface elements on a display system operatively connected to the computer system 602, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 602 may implement a web browser 636 stored program component. The web browser 636 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 602 may implement a mail server 638 stored program component. The mail server 638 may be an Internet mail server such as MICROSOFT® EXCHANGER®, or the like. The mail server 638 may utilize facilities such as ASP, ActiveX, ANSI C++/C #, MICROSOFT .NET® CGI scripts, JAVA®, JAVASCRIPT®, PERL®, PHP®, PYTHON®, WebObjects, etc. The mail server 638 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 602 may implement a mail client 640 stored program component. The mail client 640 may be a mail viewing application, such as APPLE MAIL®, MICROSOFT ENTOURAGE®, MICROSOFT OUTLOOK®, MOZILLA THUNDERBIRD®, etc.

In some embodiments, computer system 602 may store user/application data 642, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the present disclosure may overcome drawbacks of traditional systems as discussed before. The disclosure offers a solution to address various threats associated with generative AI systems. The present disclosure helps implement safety guardrails to address risks of the traditional systems. The disclosure may help in mitigating ethical and safety challenges associated with the generative AI models, and encompass various aspects, including prompt design guidelines, monitoring for misuse, content filtering, and IP checks. The disclosure may enable responsible and ethical use of the generative AI models and unlock its potential for a wide range of applications. The disclosure ensures a responsible and beneficial use of the generative AI models, promoting innovation while safeguarding against potential harm.

The disclosure discloses a system that may act as a threat detection and moderation layer for the generative AI model (for example, a foundational model or a Large Language Model (LLM)). The disclosure provides real-time and highly effective measures to detect, mitigate, filter, and rephrase both input and output of the generative AI model. This approach ensures that the users are protected from inadvertently committing violations, such as sharing Personally Identifiable Information (PII) or Intellectual Property (IP) details in their prompts, while also preventing issues like third-party IP infringement and hallucinations in the generative AI model's generated content. The advantages of the disclosure are significant. The disclosure offers real-time moderation of the data, which is crucial in today's fast-paced digital environment. This means that the users may interact with the generative AI model without any fear of accidentally violating privacy or IP rights. This is particularly valuable in applications where quick responses or content generation are essential, such as customer support, content creation, or creative writing.

The disclosure may filter out harmful or inappropriate content before it reaches the users, ensuring that the output remains safe, ethical, and compliant with various regulations. This is especially important in contexts where maintaining a positive and responsible online presence is crucial. Moreover, the disclosure addresses a wide range of concerns, making it adaptable to different applications, industries, and organizational policies. This versatility is essential for companies and organizations with diverse needs and requirements for generative AI usage. Protection against the PII and IP leaks is not just a matter of compliance but also a way to instill trust in the users. By offering a secure environment for interaction, the disclosure may encourage more widespread adoption of the generative AI across the industries and applications. The users may feel confident that their data and the IP are safeguarded, which is particularly important for businesses that rely on AI for content generation, data analysis, or other critical functions. Further, the disclosure significantly reduces burden on human moderators and reviewers. With AI-driven moderation, the process of ensuring safe and ethical content may become automated and efficient. This not only saves time and resources but also reduces risks of human errors in content review, which is especially relevant in high-volume applications.

In short, the disclosed system and method offers a holistic solution to the concerns associated with the traditional generative AI systems. The disclosure ensures real-time moderation, user-friendly configuration, and a high level of protection against privacy violations, IP infringements, and other potential issues. By this, it provides a way for a responsible and widespread use of the generative AI, with applications ranging from content generation to customer interactions benefiting from enhanced safety and compliance.

It will be appreciated that, for clarity purposes, the above description has described embodiments of the disclosure with reference to different functional units and processors. However, it will be apparent that any suitable distribution of functionality between different functional units, processors or domains may be used without detracting from the embodiments. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present embodiments have been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A processor implemented method for dynamically mitigating threats of a generative Artificial Intelligence (AI) model, the method comprising:
receiving, via one or more hardware processors, data associated with the generative AI model at a user interface (UI) of a computing device, the data associated with one or more attributes;
applying, via the one or more hardware processors, one or more macro classifiers to the data to determine, in real time, presence of one or more types of threats from amongst a plurality of types of threats, wherein each macro classifier of the one or more macro classifiers is capable of computing a first threat probability score associated with a type of threat from amongst the plurality of types of threats based on the one or more attributes associated with the data;
dynamically configuring, via the one or more hardware processors, a threat detection model comprising one or more nano classifiers to detect one or more sub-type of threats associated with the one or more type of threats in the data, wherein dynamically configuring the threat detection model comprises:
selectively moderating the data, via the one or more hardware processors, based on one or more predefined rules corresponding to each of the one or more sub-type of threats to obtain a moderated data; and
validating, via the one or more hardware processors, the moderated data to determine one of presence and absence of the one or more sub-types of threats in the moderated data.

2. The processor implemented method of claim 1, wherein the data comprises at least one of an input data and an output data.

3. The processor implemented method of claim 1, wherein the data comprises multi-modal data, the multi-modal data comprising one or more of textual data, audio data, video data, and image data.

4. The processor implemented method of claim 2, wherein each attribute from amongst the one or more attributes comprises one of nature of the input data, nature of the output data, usage history and context associated with the data, and similarity with past violations and threats.

5. The processor implemented method of claim 1, wherein dynamically configuring the threat detection model comprises:
selecting, from a database, one or more nano classifiers from amongst a plurality of nano classifiers selectively trained to detect the one or more sub-type of threats in the data;
computing, for each of the one or more sub-types of threats, a second threat probability score by the one or more nano classifiers; and
comparing, for each of the one or more sub-types of the threats, the second threat probability score with a predefined threshold value of the second threat probability score to detect the presence of the one or more sub-types of the threats in the data.

6. The processor implemented method of claim 1, wherein a type of threat from amongst the plurality of types of threats is one of a prompt injection threat, a jailbreak threat, a profanity threat, a toxicity threat, a Personal Identifiable Information (PII) leakage threat, an Intellectual Property (IP) violation threat, an organization policy and role-based threat, a hallucination threat, security attacks, and sensitive information leakage threat.

7. The processor implemented method of claim 1, wherein the one or more nano classifiers comprises at least one of one or more Machine Learning (ML) models, one or more deep learning models, one or more transfer learning models, one or more rule-based repositories, one or more datasets and dictionaries, one or more custom and finetuned models, one or more knowledge databases, one or more Retrieval Augmented Generation (RAG) model, and a reminder generation model.

8. The processor implemented method of claim 1, wherein moderating the data comprises performing at least one of filtering and rephrasing at least a portion of the data.

9. The processor implemented method of claim 1, wherein validating the moderated data comprises iteratively:
computing, for each of the one or more sub-types of threats in the moderated data, the second threat probability score;
comparing the second threat probability score with the predefined threshold value of the second threat probability score; and
moderating the moderated data, until the second threat probability score is determined to be less than the predefined threshold value of the second threat probability score, wherein the second threat probability score being less than the predefined threshold value is indicative of absence of the one or more sub-types of threats in the moderated data.

10. The processor implemented method of claim 9, further comprises:
restricting moderating the moderated data upon determining the second threat probability score greater than or equal to the predefined threshold value of the second threat probability score for a predefined number of iterations; and
rendering details of restricting the moderated data on the UI.

11. The processor implemented method of claim 1, further comprising learning a set of emerging types of threats and a set of emerging sub-types of threats using reinforcement learning with human feedback (RHFL).

12. The processor implemented method of claim 1, further comprising:
tracking a telemetry status of the data; and
updating the one or more nano classifiers, the threat detection model, and one or more policies associated with an entity implementing the generative AI model based on the telemetry status of the data.

13. A system for dynamically mitigating threats of a generative Artificial Intelligence (AI) model, the system comprising:
one or more hardware processors; and
a memory communicatively coupled to the one or more hardware processors, wherein the memory stores processor-executable instructions, which, on execution, causes the one or more hardware processors to:
receive data associated with a generative AI model at a user interface (UI) of a computing device, the data associated with one or more attributes;
apply one or more macro classifiers to the data to determine, in real time, presence of one or more types of threats from amongst a plurality of types of threats, wherein each macro classifier of the one or more macro classifiers is capable of computing a first threat probability score associated with a type of threat from amongst the plurality of types of threats based on the one or more attributes associated with the data;
dynamically configure a threat detection model comprising one or more nano classifiers to detect one or more sub-type of threats associated with the one or more type of threats in the data;
selectively moderate the data based on one or more predefined rules corresponding to each of the one or more sub-type of threats to obtain a moderated data; and
validate the moderated data to determine one of presence and absence of the one or more sub-types of threats in the moderated data.

14. The system of claim 13, wherein the data is at least one of an input data or output data, and wherein the data is multi-modal data comprising one or more of a text, an audio, a video, and an image.

15. The system of claim 13, wherein to dynamically configure the threat detection model, the one or more hardware processors are configured by the instructions to:
select, from a database, one or more nano classifiers from amongst a plurality of nano classifiers selectively trained to detect the one or more sub-type of threats in the data;
compute, for each of the one or more sub-types of threats, a second threat probability score by the one or more nano classifiers; and
compare, for each of the one or more sub-types of the threats, the second threat probability score with a predefined threshold value of the second threat probability score to detect the presence of the one or more sub-types of the threats in the data.

16. The system of claim 13, wherein to moderate the data, the processor-executable instructions further cause the one or more hardware processors to perform at least one of filtering and rephrasing at least a portion of the data.

17. The system of claim 13, wherein to validate the moderated data, the processor-executable instructions further cause the one or more hardware processors to iteratively:
compute, for each of the one or more sub-types of threats in the moderated data, the second threat probability score;
compare the second threat probability score with the predefined threshold value of the second threat probability score; and
moderate the moderated data, until the second threat probability score is determined to be less than the predefined threshold value of the second threat probability score, wherein the second threat probability score being less than the predefined threshold value is indicative of absence of the one or more sub-types of threats in the moderated data.

18. The system of claim 17, wherein the processor-executable instructions further cause the one or more hardware processors to:
restrict moderating the moderated data upon determining the second threat probability score greater than or equal to the predefined threshold value of the second threat probability score for a predefined number of iterations; and
render details of restricting the moderated data on the UI.

19. The system of claim 13, wherein the processor-executable instructions further cause the one or more hardware processors to:
track a telemetry status of the data; and
update the one or more nano classifiers, the threat detection model, and one or more policies associated with an entity implementing the generative AI model based on the telemetry status of the data.

20. A non-transitory computer-readable medium storing computer-executable instructions for dynamically mitigating threats of a generative Artificial Intelligence (AI) model, the stored computer-executable instructions, when executed by one or more hardware processors, cause the one or more hardware processors to perform operations comprising:
receiving data associated with a generative AI model at a user interface (UI) of a computing device, the data associated with one or more attributes;
applying one or more macro classifiers to the data to determine, in real time, presence of one or more types of threats from amongst a plurality of types of threats, wherein each macro classifier of the one or more macro classifiers is capable of computing a first threat probability score associated with a type of threat from amongst the plurality of types of threats based on the one or more attributes associated with the data;
dynamically configuring a threat detection model comprising one or more nano classifiers to detect one or more sub-type of threats associated with the one or more types of threats in the data;

selectively moderating the data based on one or more predefined rules corresponding to each of the one or more sub-type of threats to obtain a moderated data; and validating the moderated data to determine one of presence and absence of the one or more sub-types of threats in the moderated data.

\* \* \* \* \*